(12) United States Patent
Dehlsen et al.

(10) Patent No.: US 8,237,304 B2
(45) Date of Patent: Aug. 7, 2012

(54) MULTI-POINT TETHERING AND STABILITY SYSTEM AND CONTROL METHOD FOR UNDERWATER CURRENT TURBINE

(75) Inventors: James G. P. Dehlsen, Montecito, CA (US); Matthew Brown, San Diego, CA (US); Christopher Grieco, Buellton, CA (US)

(73) Assignee: Aquantis, L.L.C., Carpinteria, CA (US)

( * ) Notice: Subject to any disclaimer, the term of this patent is extended or adjusted under 35 U.S.C. 154(b) by 378 days.

(21) Appl. No.: 12/666,531

(22) PCT Filed: May 20, 2008

(86) PCT No.: PCT/IB2008/001247
§ 371 (c)(1), (2), (4) Date: Dec. 23, 2009

(87) PCT Pub. No.: WO2009/004420
PCT Pub. Date: Jan. 8, 2009

(65) Prior Publication Data
US 2010/0181774 A1 Jul. 22, 2010

Related U.S. Application Data

(60) Provisional application No. 60/937,813, filed on Jun. 29, 2007.

(51) Int. Cl.
*F03B 13/00* (2006.01)
(52) U.S. Cl. .......................................... 290/54; 290/43
(58) Field of Classification Search .................. 290/54, 290/43; 417/334; 415/7; 60/398
See application file for complete search history.

(56) References Cited

U.S. PATENT DOCUMENTS

| 4,864,152 | A | 9/1989 | Pedersen |
| 6,091,161 | A | 7/2000 | Dehlsen et al. |
| 6,923,622 | B1 * | 8/2005 | Dehlsen ........................ 416/87 |
| 2003/0193197 | A1 | 10/2003 | Hibbs et al. |
| 2008/0048453 | A1 * | 2/2008 | Amick ........................... 290/44 |
| 2010/0026007 | A1 * | 2/2010 | Bevirt ........................... 290/55 |
| 2010/0276935 | A1 * | 11/2010 | Dehlsen et al. ................ 290/54 |
| 2011/0025069 | A1 * | 2/2011 | Kumano ........................ 290/54 |

FOREIGN PATENT DOCUMENTS

| DE | 10036314 | 2/2002 |
| WO | 0077393 | 12/2000 |
| WO | 2004083629 | 9/2004 |
| WO | 2006117830 | 11/2006 |

OTHER PUBLICATIONS

International Search Report and Written Opinion of the International Searching Authority dated May 7, 2009.

* cited by examiner

*Primary Examiner* — Hae Moon Hyeon
(74) *Attorney, Agent, or Firm* — Rankin Hill & Clark LLP

(57) ABSTRACT

A method of controlling a tethered, underwater, water current-driven turbine, power-generating device. The device is comprised of dual turbines and dual rotor blades turned by fluid flow, each turbine including one or more generators driven by rotor blades. The device is connected by device tethers to a strut, which is moveable to control depth of the device. The strut is connected to the ocean floor by tripodal tethers: a main tether, a left side tether and a right side tether, which are strut control tethers. One or more winches are controlled to maintain operation of the device within set parameters by varying the tension on one or more of the strut control tethers.

15 Claims, 14 Drawing Sheets

MULTI-POINT TETHERING AND STABILITY SYSTEM AND CONTROL METHOD FOR UNDERWATER CURRENT TURBINE

BACKGROUND OF THE INVENTION

1. Field of the Invention

This invention relates to hydroelectric power-generating devices that use underwater currents to drive electricity-generating turbines.

2. Description of the Prior Art

The use of underwater power generators for generating electricity from water current flow, such as rivers and oceans, is known in the art. There are two types of prior devices: stationary turbines and tethered turbines. Stationary types of turbines are comprised of stationary towers based on the ocean floor. Electricity generating turbines are mounted on the towers at a fixed depth, with turbine rotor blades facing the flow of an ocean current. The disadvantages of this type of design are the underwater construction costs and the engineering challenges of deploying towers in deeper waters. Examples of these devices are being tested in Europe as tidal turbines and a few are being tested now in North American waters as of 2007.

Tethered devices are designed to operate underwater, and are kept in place by a tether system that is anchored to the ocean floor. In some cases, a wing (hydrofoil) provides lift and/or ballast tanks provide buoyancy to keep the devices from descending. Some devices use a buoyancy chamber to regulate their overall buoyancy thereby adjusting their operating depths in a current stream. Other devices add a moveable wing that serves as a stabilizer to control the depth of the device. The wing is adjusted to cause the device to dive or surface in response to emergency conditions such as floating debris on a river.

An example of this type of turbine device is an underwater power plant called the Coriolis Project. The design called for a ducted, catenary turbine, 171 meters in diameter, capable of producing 83 MW of electricity. The turbine was to be tethered at a fixed depth.

U.S. Pat. No. 6,091,161 discloses a method of controlling a tethered, underwater, water current-driven turbine, power-generating device. A predetermined maximum depth and a predetermined minimum depth are set. In response to sensing depth of the device, an ascend protocol or a descend protocol are selectively invoked. These protocols maintain an operating depth of the device that is midway between the predetermined maximum depth and the predetermined minimum depth. The turbine includes variable-pitch rotor blades. A maximum allowable drag force load on the turbine rotors is selected. The pitch of the variable-pitch rotor blades on the turbine is adjusted such that the drag force loading of the device does not exceed a maximum design level.

The Manta Ray™ is a tethered marine turbine similar to an underwater kite-surf. An asymmetric nozzle provides lift and funnels water to a small turbine near the outlet for generating electricity. The device is described in International Application WO 2006/117830, entitled "Water Turbine In Tethered Asymmetric Nozzle" published Sep. 11, 2006, inventor Francis Allen Farrelly.

The application describes an energy generating device for harnessing submarine currents composed of an asymmetric nozzle capable of directing the water flow towards one or more turbines placed before the said nozzle's outlet. The nozzle's inlet is asymmetric in shape; one surface of the inlet extends beyond its opposite surface, thus acting as a lifting surface producing a force with a component perpendicular to the current flow. The device is moored with a tether-line system, which enables the device to remain in equilibrium, by counteracting the vertical component of the tether's tension, with the vertical lift due to the water flowing through the asymmetric nozzle.

Another underwater turbine device is described in International Application WO 2000/077393, entitled "Dual Hydro-turbine Unit" published Dec. 12, 2000, inventor Philippe Vauthier.

The Vauthier application describes an environmentally non-intrusive multiple turbine unit for adjustable deployment in water. The turbines are captured in a shroud having an integrally formed augmentor ring and ballasting member to improve efficiency. The multiple turbine arrangement effectively counteracts the rotational counter-torque of individual turbines, thereby enabling stable deployment of the unit without requiring rigid stabilizing structures.

What is needed is a way of controlling a tethered, underwater, water current-driven turbine, power-generating device in a simplified and cost-effective manner such that the inconsistent and varying ocean currents do not greatly affect the stability, safety and power generating performance. In order to keep installation and maintenance costs of such a device down, it is desirable to provide minimal underwater structures and construction. This means that one must be able to safely bring the device to the surface for maintenance or for replacement of single or multiple turbines without altering the arrays, consisting of a plurality of turbine modules.

It is also desirable to provide for emergencies that require a complete shutdown of the device without immediate surfacing of the device for maintenance or repair.

Submerging further from an operating depth due to inclement weather or other force major events is desired.

SUMMARY OF THE INVENTION

In accordance the present invention, a tethering apparatus and method is provided for a device operating by lift in a fluid flow.

The method of controls depth of the device in the fluid by anchoring a control strut in respect of said fluid flow by means of tripodal strut control tethers, connecting the device to the control strut, so that movement of the strut effects depth movement of said device, and, moving the strut by lengthening and shortening at one or more of the strut control tethers.

In accordance with an aspect of the invention, the length of the control tether is selectively varied to maintain operation of the device within set parameters.

In accordance with an aspect of the invention, a predetermined maximum depth and a predetermined minimum depth are set, the depth of the device is sensed, and, in response to sensing the depth of the device, the length of a control tether is varied to maintain an operating depth of the device that is between the predetermined maximum depth and the predetermined minimum depth.

The apparatus in accordance with the invention comprises a strut, which provides buoyancy. The apparatus further comprises a buoyancy providing device connected by device tethers to said strut, said strut being moveable to control depth of said device, a main tether, a left side tether and a right side tether, anchoring said strut, wherein at least one of said tethers being a variable length tether, and a length control connected to said variable length tether.

Since the depth of the strut and the device are altered by the length control, neither the strut nor the device must provide variable buoyancy. It is sufficient that the strut and the device provide predetermined constant buoyancy which allows a constructively simple and therefore cost-effective structure of the strut and the device.

In accordance with an aspect of the invention said length control is provided by at least one winch for controlling tension on one or more tethers. The winch can be arranged by the anchor of the tether being variable in length. However, it is preferred that the winch is provided in the strut.

In accordance with an aspect, of the invention, the device is a turbine that includes turbine rotor blades. A, maximum drag force loading and a maximum power generation of the turbine rotor blades is selected, and, the pitch of the turbine rotor blades adjusted such that the drag force loading and the power generation do not exceed said maxima.

In accordance with a preferred embodiment of the invention said device includes dual turbines with rotor blades turned by the fluid flow.

In accordance with the present invention, the tethering system uses a plurality of tether lines in a novel tripodal geometry to provide stability in all degrees of freedom while maximizing power extraction by optimizing alignment and depth to current flows including the cases where (i) normal current flow is present, (ii) direction of the current changes by up to 20 degrees, (iii) the velocity of the flow decreases below some predetermined minimum operating target.

In accordance with an aspect of the invention, the turbine includes variable-pitch rotor blades. The pitch of the variable-pitch rotor blades is adjusted such that the drag force loading of the device may be controlled. The blades can be feathered out of the flow when the device is commanded to lift to the surface or is commanded to shut down at any depth.

In accordance with an aspect of the invention, an emergency shutdown command causes the pitch of the variable-pitch rotor blades to be adjusted such that the rotor rotation and power output of the device are reduced to substantially zero. The positive buoyancy keeps the device stable until it can be surfaced for service.

An advantage of the invention is that neither buoyancy of the strut or the device nor a degree of lift from a wing is required to be variable to achieve the objectives of the invention. Furthermore, no wing is required, and in particular, no wing with a variable lift is required since a positive buoyancy is provided by the device and the strut.

The invention has the advantage that it provides stability in all degrees of freedom but provides the flexibility of twisting about a vertical axis (moving in yaw) in the current flow for directional changes.

The invention has the advantage that it provides stability in all degrees of freedom but allows the flexibility of depth adjustment for velocity changes (moves in pitch and is depth adjustable by simple controls).

The invention has the advantage that it provides for a remote command to effect rising to the surface for servicing and for submerging to depth to avoid severe weather-induced flow disruption.

The invention has the advantage that it provides stability if the counter-rotating torques generated by the blades significantly differ.

The invention has the advantage that it provides stability if the flow sharply decreases or increases in velocity.

The invention has the advantage that it provides stability if the flow sharply changes direction.

The invention has the advantage that it does not rely on dynamic response of buoyancy adjustments or lift surface adjustments to restore stability.

The invention has the advantage that it provides stability if marine growth adversely affects the lift of the wing.

The invention has the advantage that it provides for optimized power generation if the counter-rotating torques generated by the blades significantly differ.

The invention has the advantage that it provides for optimized power generation if the flow sharply decreases or increases in velocity.

The invention has the advantage that it provides for optimized power generation if the flow sharply changes direction.

The invention has the advantage that it does not rely on dynamic response of buoyancy adjustments or lift surface adjustments to restore optimized power generation.

The invention has the advantage that it provides for optimized power generation if marine growth adversely affects the lift of the wing.

BRIEF DESCRIPTION OF THE DRAWINGS

The invention will be described in detail with reference to the drawings in which.

DESCRIPTION OF THE PREFERRED EMBODIMENT

The invention relates to a multi-point tethering and stability system for underwater current turbines providing for yaw and depth adjustment capability in the current flow to optimize power extraction while maintaining operating stability in all degrees of freedom without requiring active lift or buoyancy adjustment and controls.

A method is described of tethering an underwater, water current-driven turbine, power-generating device to achieve stability in all degrees of freedom without the need to use buoyancy variation or lift adjusting mechanisms for depth adjustment that allows for yaw and depth adjustment in the current flow to optimize power extraction. The turbine includes variable-pitch rotor blades. A maximum allowable drag force load on the turbine rotors is selected. The pitch of the variable-pitch rotor blades on the turbine is adjusted such that the drag force loading of the device does not exceed a maximum design level.

The extraction of power in the form of electricity through the use of ocean current turbines involves very high loads imparted through the device components, structure and its mooring systems and involves the highly unpredictable ocean current, which has varying velocities and direction. Large rotors, capable drive systems and significant structures are employed for the extraction of meaningful power; that is, an amount that translates into financial sense from a business case perspective. The tethering system employed by the present invention is robust not just in terms of strength, but also in terms of functionality and flexibility for deployment, service, emergency submergence and optimal power extraction.

The mooring system of the present invention allows the device to be surfaced for service. It also allows the device to be submerged to depth for severe weather-induced flow disruptions. Ocean deployment or service processes involving people are not permitted nor are they necessary to occur under water with people. All is accomplished through utilization of ROVs or remote-triggered equipment.

Devices that are fixed in space in the flow may achieve stability however they face suboptimal operating circumstances when current flow direction and/or velocity changes significantly. The present invention allows for directional facing alignment to the flow and for depth adjustments in the flow. The power extracted by a moving fluid is proportional to the cube of the velocity, thus should an ocean current turbine device encounter seasonal or otherwise prolonged slower velocities, its production and hence return on investment would be suboptimal.

Figure 1:
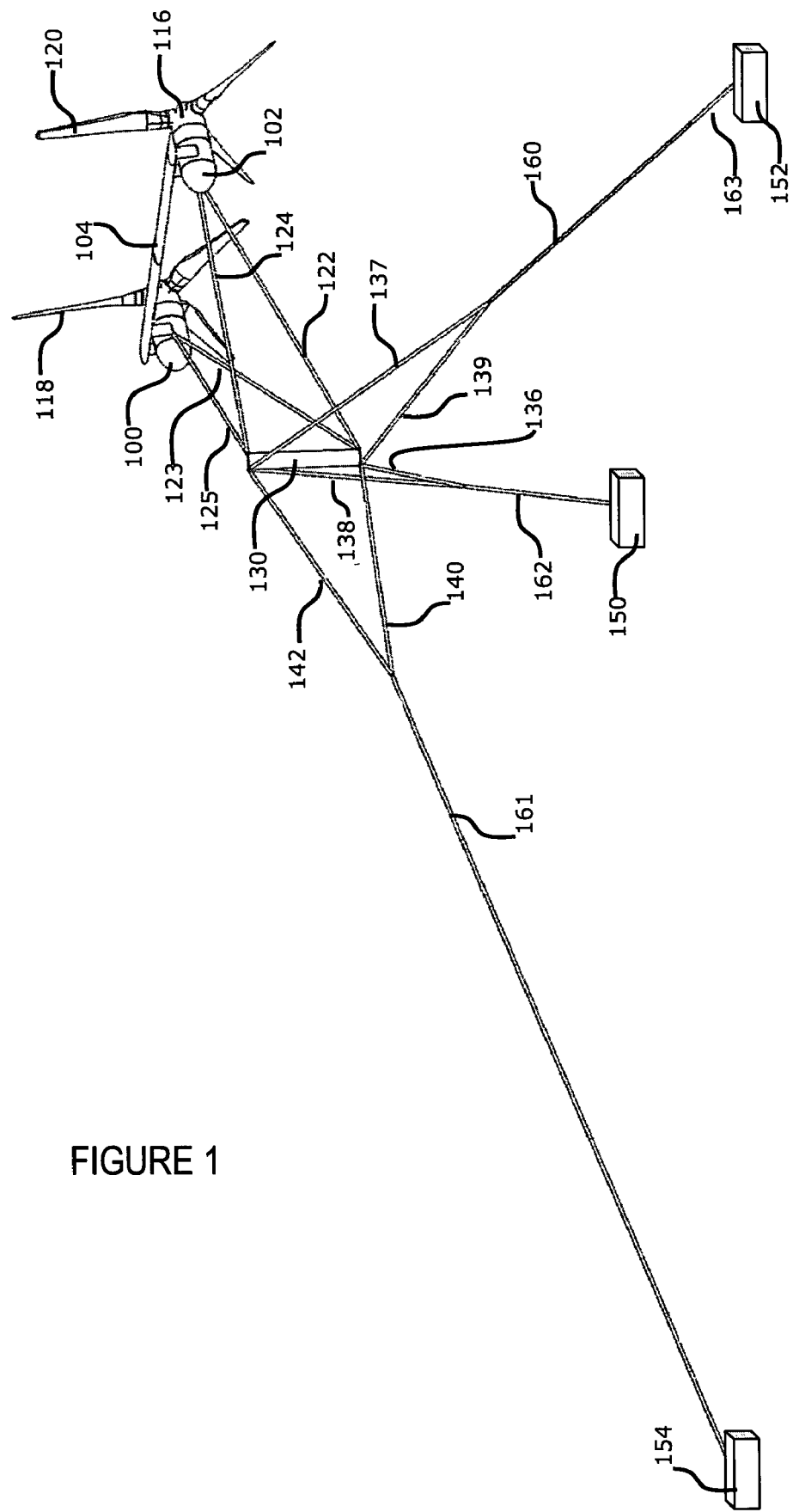
FIG. 1 is a front, side view in perspective of an underwater power-generating device in which the present invention is embodied.
Figure 7:
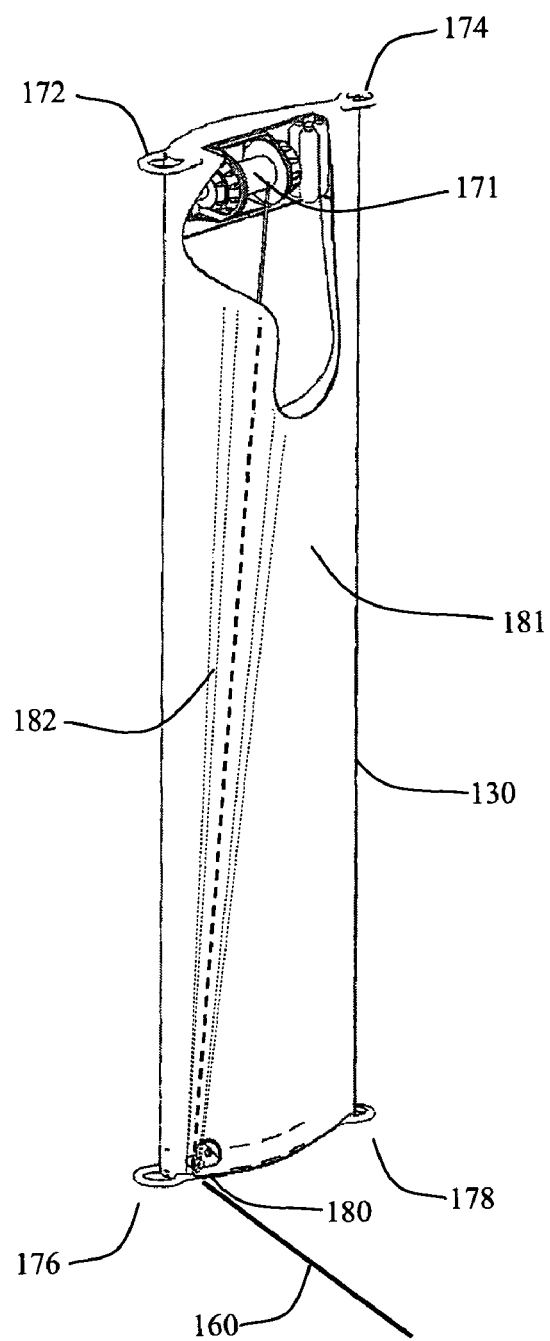
FIG. 7 is a perspective view of the cable strut 130 shown in FIG. 1, including a winch system for controlling tension on a tether line.

FIG. 1 illustrates an underwater power-generating device in accordance with the present invention. The system includes a buoyancy providing strut (130), also referred to herein as a cable strut, and a buoyancy providing device (e.g., nacelles 100 and 102) connected by device tethers (122, 123, 124, 125) to the strut (130). The strut (130) is moveable to control depth of the device. A main tether (161), a left side tether (162) and a right side tether (163), anchor the strut. One of said tethers (e.g., right side tether (163)) is a variable length tether (160), also referred to herein as a tether line and a cable. A length control is connected to the variable length tether. The length control is a winch or winch system (171) arranged in the strut (130) for controlling tension on the tether (160) (FIG. 7). When the tether (160) is wound upon the winch, the device is lowered and when the tether (160) is unwound from the winch, the device is raised by buoyancy of the device and/or the strut. In another embodiment of the invention the winch (171) can be arranged at the anchor of the relevant tether.

The embodiment shown in FIG. 1 includes a pair of electric generators (i.e., power generating devices) housed in the fluid-tight nacelles (100) and (102), which are connected together by a hydrofoil wing structure, which consists of a central section (104). In this embodiment of the apparatus the buoyancy of the device is provided by the fluid-tight nacelles (100) and (102). However, in another embodiment of the apparatus the buoyancy of the device can be provided by hollow or foam filled tanks connected to the device.

The central section (104) positions and supports the nacelles (100, 102) on the lower surface of the central section (104) with each of the nacelles located underneath the central section (104) of the hydrofoil wing structure.

Each turbine has a rotor (114) and (116) with variable pitch blades, (118) and (120), respectively, which, rotate in opposite directions so that the torque forces on the structure balance. The nacelles (102) and thus the power-generating device housed therein is tethered underwater in the path of the water current by a pair of tethers (122, 124). The nacelles (100) and thus the power-generating device housed therein is tethered underwater in the path of the water current by a pair of tethers (123, 125). The tethers (122-125) are referred to as "device tethers". The rotors (114) and (116) are positioned relative to the hydrofoil wing structure, and particularly the central section (104) such that water current first moves past the central section (104), then engages, and causes rotation of the rotors (114 and 116). The device tethers (122-125) extend from tether-connecting members, on the body of each nacelle (100 and 102), to a cable strut (130).

Refer to FIG. 7, which is a perspective view of the cable strut (130) shown in FIG. 1, including a winch system (171) for controlling tension on the tether line (160). The pair of tethers (122, 124) is connected to couplings (178, 174) on the cable strut (130) and the pair of tethers (123, 125) is connected to couplings (178, 174) on the cable strut (130). The cable strut (130) is provided with a hollow tank or foam filled portion (181) to provide buoyancy and a channel (182) within the portion (181) for the cable (160) to pass through, via idler wheel (180), and wind upon the winch (171).

In another embodiment of the invention the strut (130) can comprise two winches so that two of the tethers are variable in length. Furthermore, one winch can be arranged in the strut (130) and the other winch can be arranged at the anchor of the relevant tether.

Side tethers (136,138) are connected to couplings (172, 176) on the cable strut (130) and join into a single aft, fixed length cable (162), which is anchored to a first anchoring member (150) located on the ocean floor. Side tethers (137, 139) are connected to couplings (172, 176) on the cable strut (130) and join into the variable length tether (160) which is anchored to a second anchoring member (152) located on the ocean floor. The winch (171) located within the cable strut (130) is used to vary the section (160) of tether (163) by taking in or letting out cable. The cable strut (130) is also connected to main leading tethers (140, 142) that join with a single main tether (161), which is anchored (154) to the ocean floor. The tethers 136, 137, 138, 139, 140, 142) are referred to as "control tethers". The underwater power-generating device benefits from the stability of the three groups of tethers (tripodal strut control tethers) anchored to the ocean floor.

Figure 2:
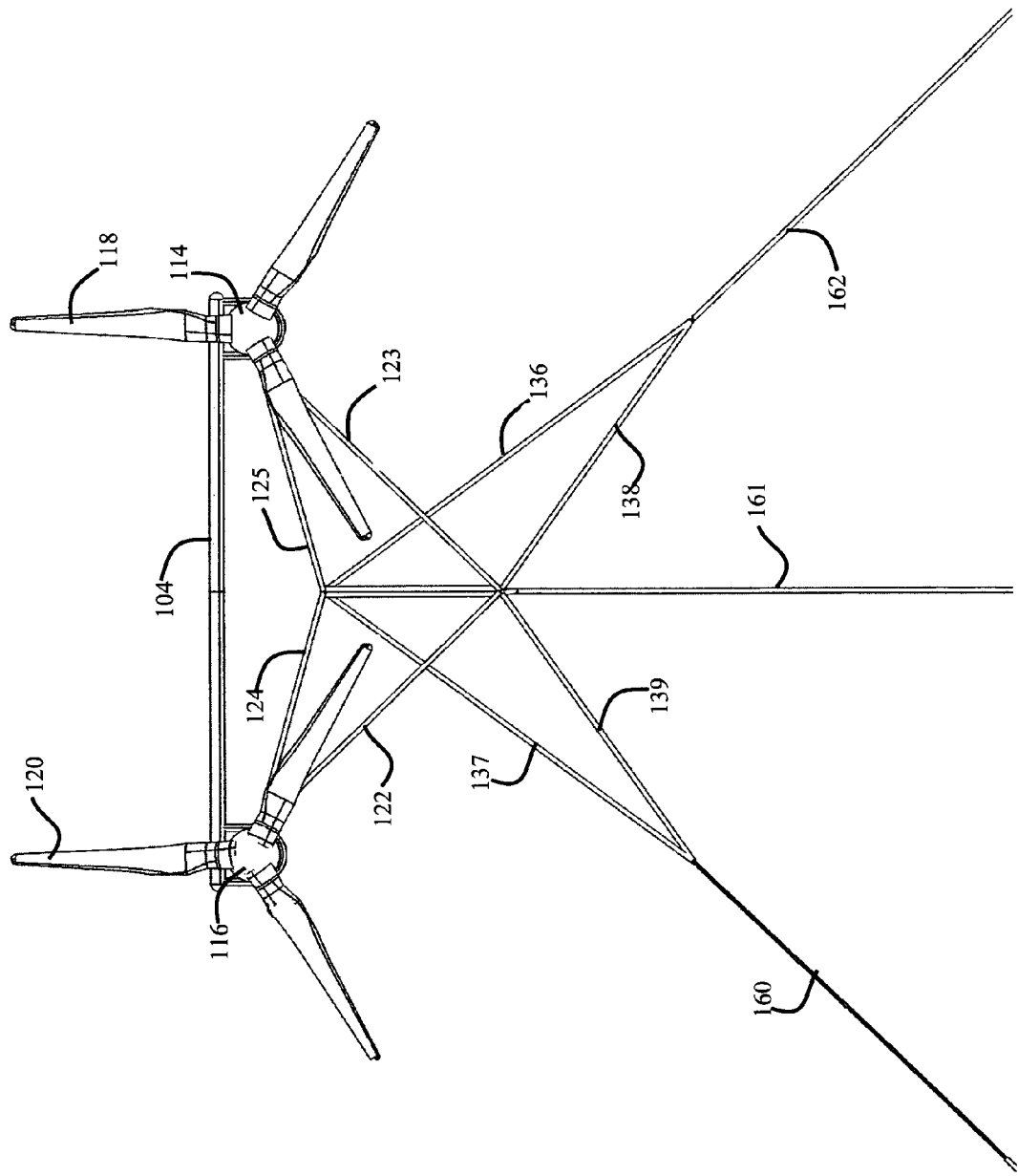
FIG. 2 is a rear elevation of the power-generating nacelles shown in FIG. 1.
Figure 3:
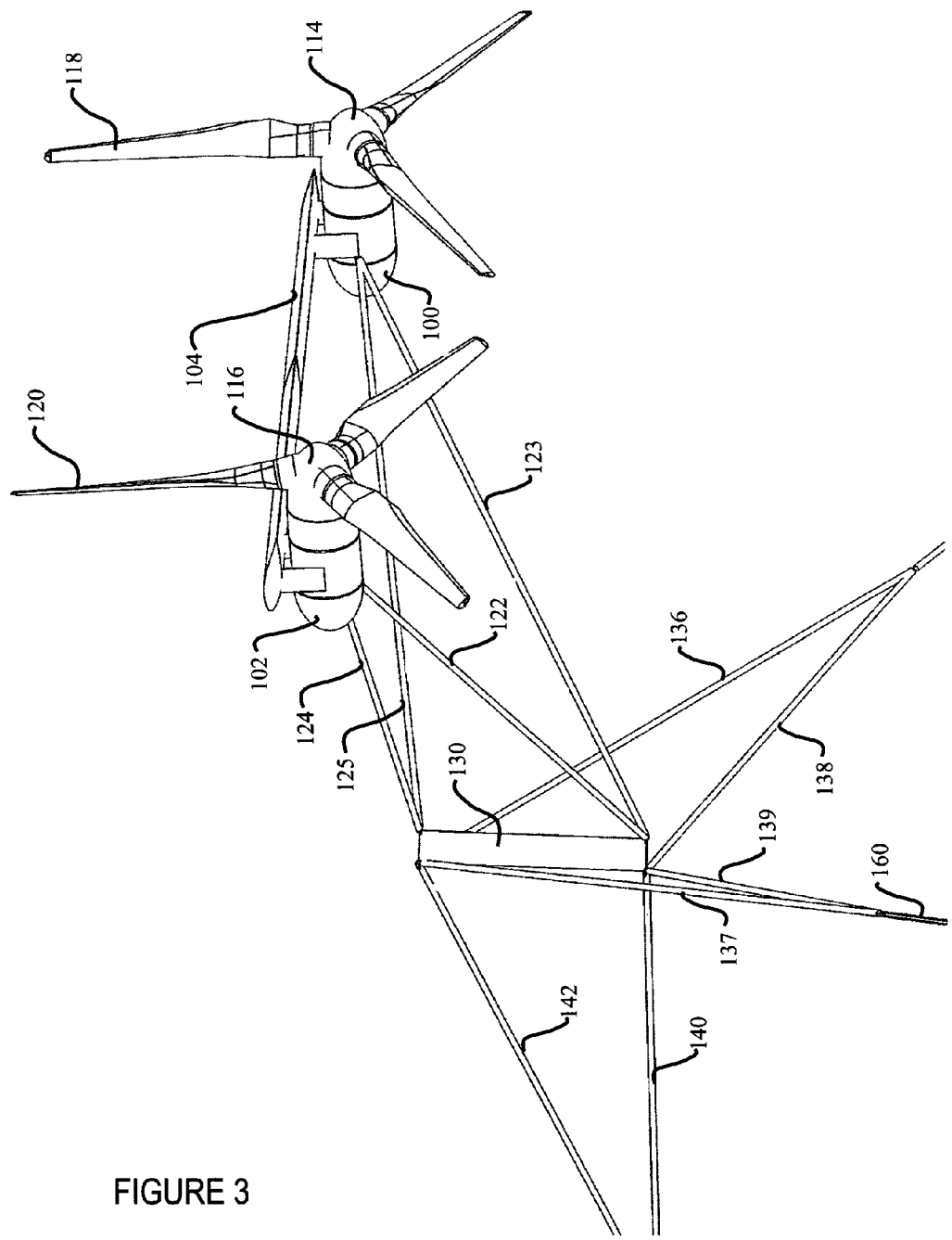
FIG. 3 is a rear, side view in perspective of the power-generating nacelles shown in FIG. 1.
Figures 4A, 4B, 4C, 4D:
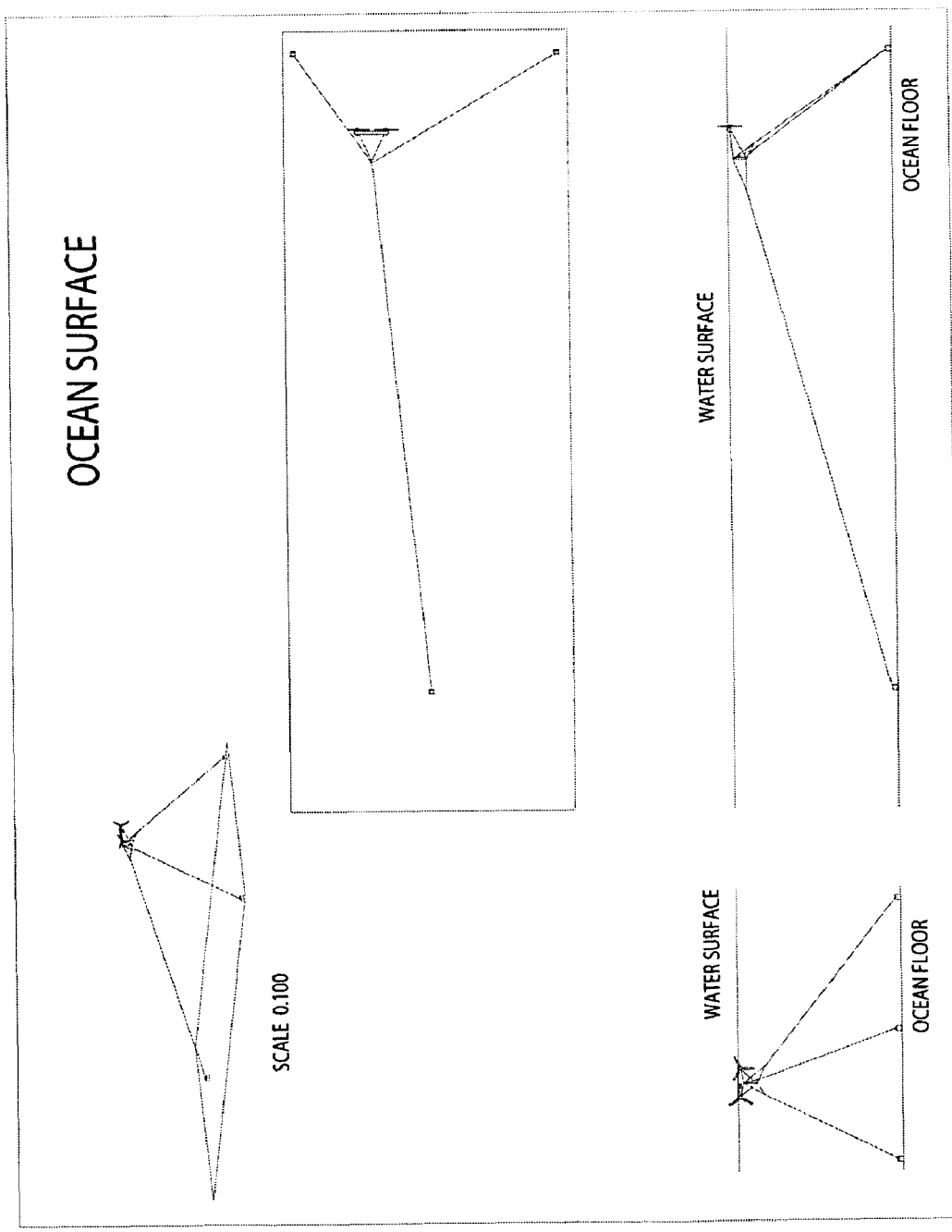
FIGS. 4 *a-d* are, respectively, a perspective view, a top plan view, a view in the direction of fluid flow, and a side view of the tethered power-generating device showing the placement of the anchors and tether lines wherein the device is raised to the water surface.
Figures 5A, 5B, 5C, 5D:
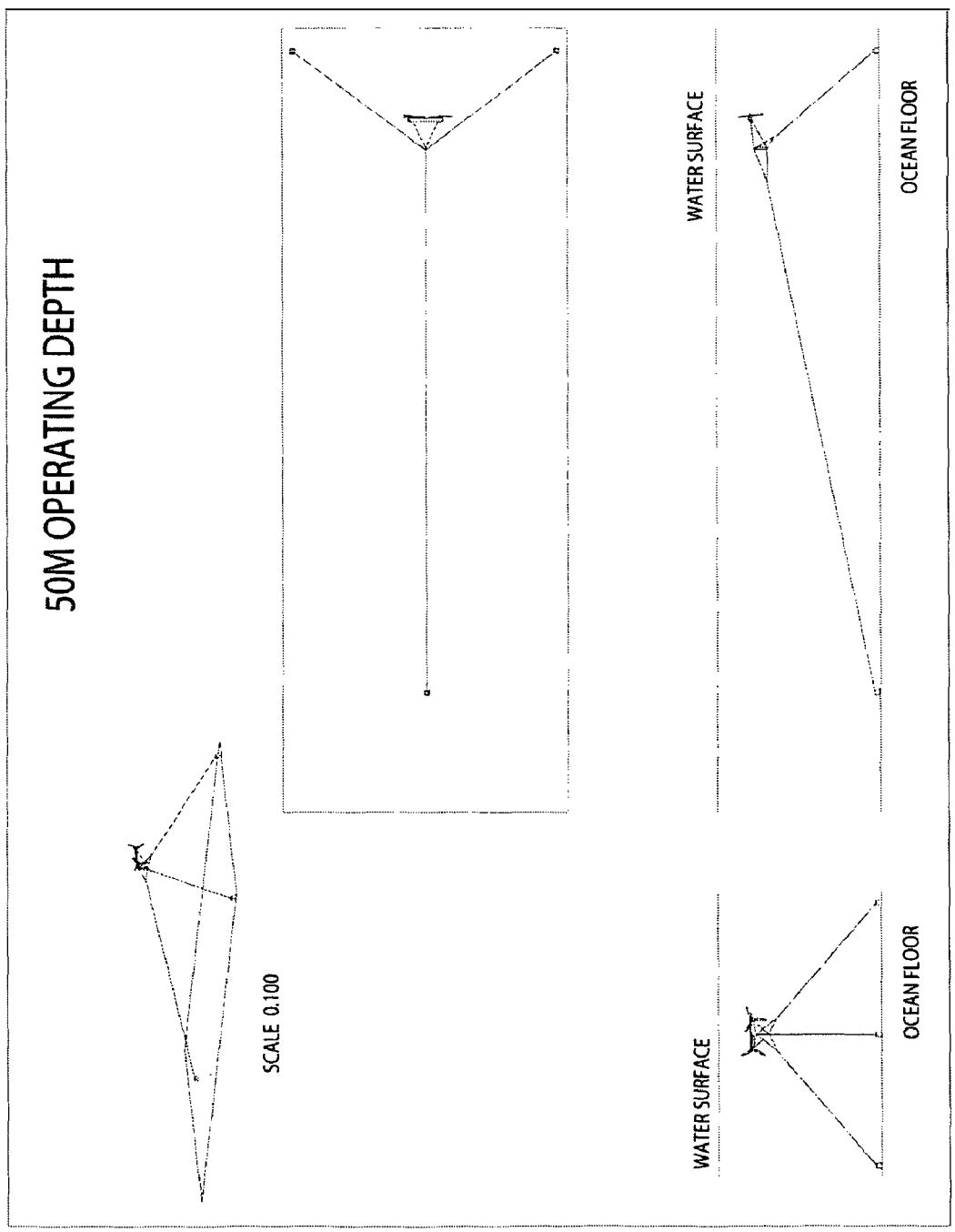
FIGS. 5 *a-d* are, respectively, a perspective view, a top plan view, a view in the direction of fluid flow, and a side view of the tethered power-generating device showing the placement of the anchors and tether lines wherein the device is at 50 m operating depth in respect of the water surface.
Figures 6A, 6B, 6C, 6D:
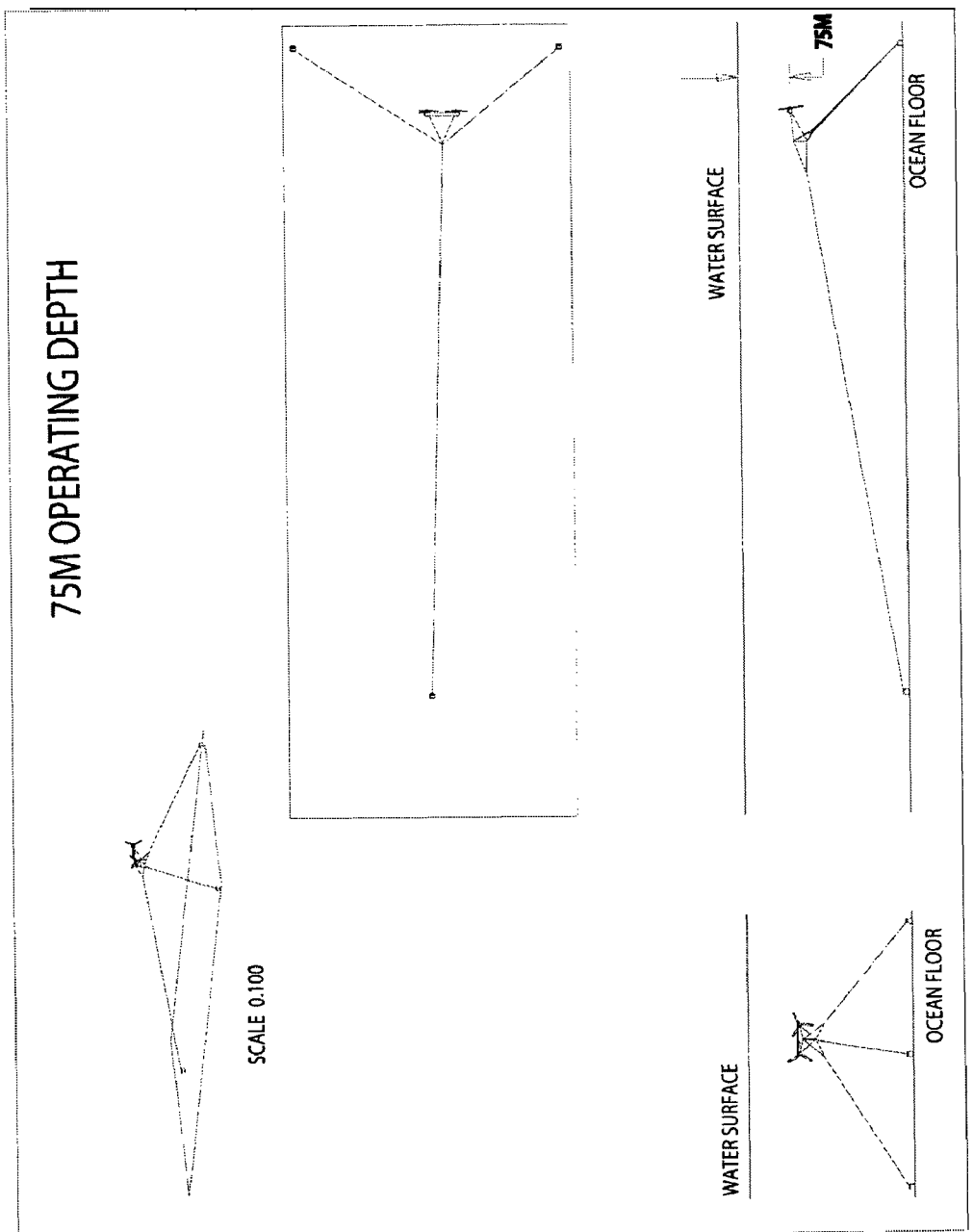
FIGS. 6 *a-d* are, respectively, a perspective view, a top plan view, a view in the direction of fluid flow, and a side view of the tethered power-generating device showing the placement of the anchors and tether lines wherein the device is at 75 m operating depth in respect of the water surface.

The electric generators in the nacelles (100, 102) are connected to neutrally buoyant power carrying cables (such as shown in FIG. 2 of U.S. Pat. No. 6,091,161). The neutrally buoyant power-carrying cables extend downstream from the device, within a cone shaped cage or similar routing device, to prevent entanglement with the rotor blades. The power cables may extend upstream along the tether lines before inter-connecting to the other units or to the shore-based power grid.

The underwater power-generating device is restrained against the current by the main tether (161), which can also be referred to as the main leading tether cable, deployed at a selected angle to the ocean floor and its down-stream control tethers (140, 142), which attach to the cable strut.

A variable downstream drag force is produced by the flow of water around the underwater power-generating device and varies as the square of the water current velocity varies. The greatest portion of this drag is generated as the flow passes across the plane of the two rotors. In addition, the device produces a greater drag while the rotors are being rotated by the water current and driving the generators than while the rotors are not rotating, and the minimum drag occurs when the blades are feathered (parallel to the flow) or are at zero pitch (perpendicular to the flow). If the blades are at a zero pitch or are fully feathered, the drag exerted by the flow on the rotors is small, and the lift force exerted by the flow on the rotor blades is minimal or zero, resulting in no rotation.

The drag exerted on the underwater power-generating device, coupled with the main tether angle, results in a variable downward force proportional to the square of the water current velocity. With the embodiment shown in FIG. 1 this downward force is compensated for by a combination of the device/strut buoyancy and the lift force on the hydrofoil. However, as mentioned above, the lift force of the hydrofoil is not necessary to compensate the downward force since the strut and the device are designed to provide enough buoyancy to overcome this downward force even is there is no lift force.

The device is subject to essentially four major forces acting in the vertical direction: gravity, buoyancy, lift, and the vertical component of the tension on the control tethers. The vertical component of the tether tension is proportional to the downstream drag force, which is proportional to the square of the current velocity. This downward drag translation is produced by the angle of main tether relative to the direction of the current flow. The buoyant force is generated by the net positive buoyancy of the device. Lift force is a lifting force produced by the current flowing past the hydrofoil (104). Such a lift force is, of course, not present if the apparatus does not comprise such a hydrofoil.

By ensuring that the positive buoyancy of the device is great enough to overcome the weight of all components when lift is zero and drag is maximum and by designing the anchors, tether cables and winch strengths to be capable of withstanding these maximum loads, the device should always maintain a safe depth. A control mechanism can drive the winch to alter depth upward or downward for any reason.

Figure 8:
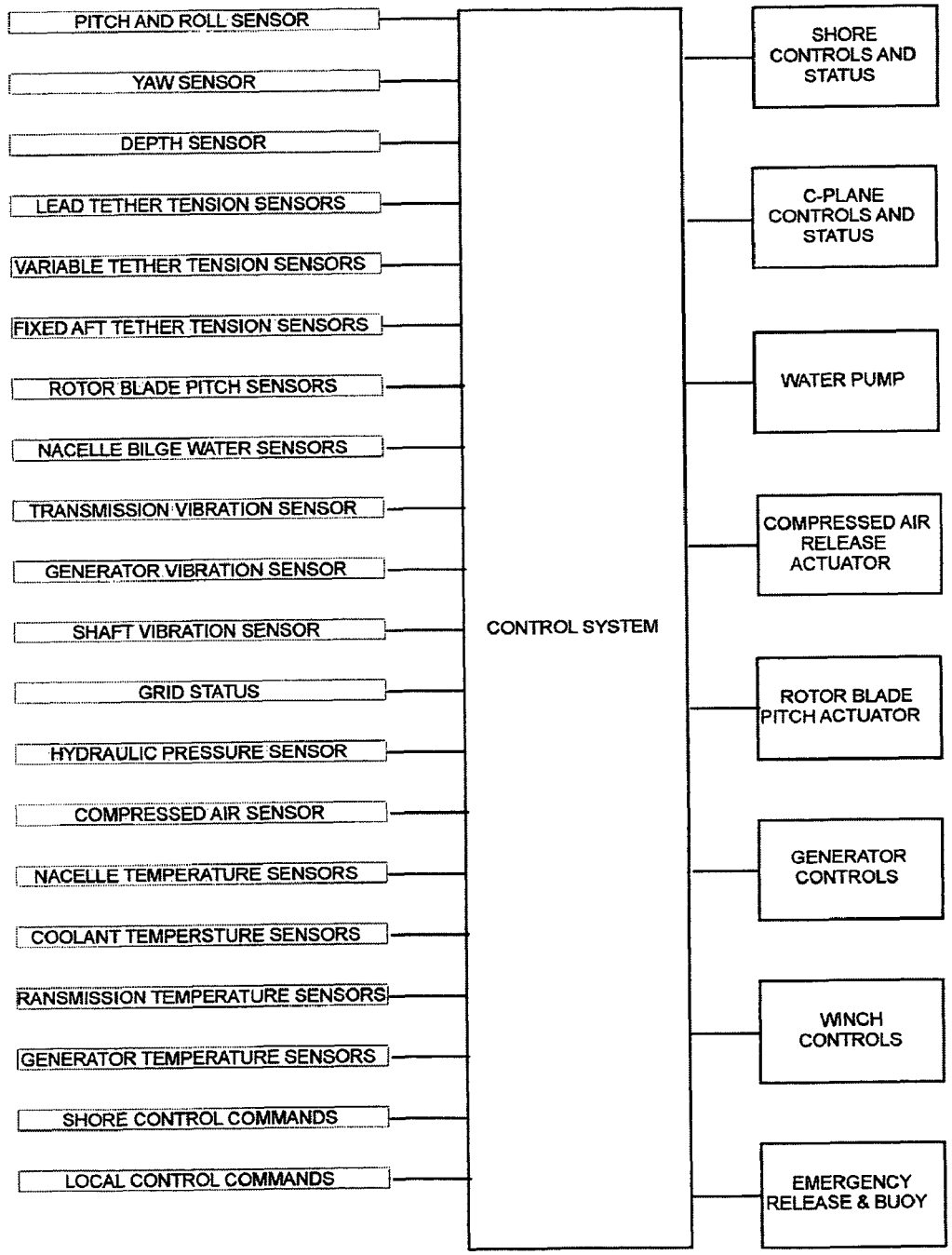
FIG. 8 is a block diagram of a control system for controlling operation of the device shown in FIG. 1; and, FIGS. 9-14 are flow diagrams of software within the control system of FIG. 8 for controlling operation of the device shown in FIG. 1.
Figure 9:
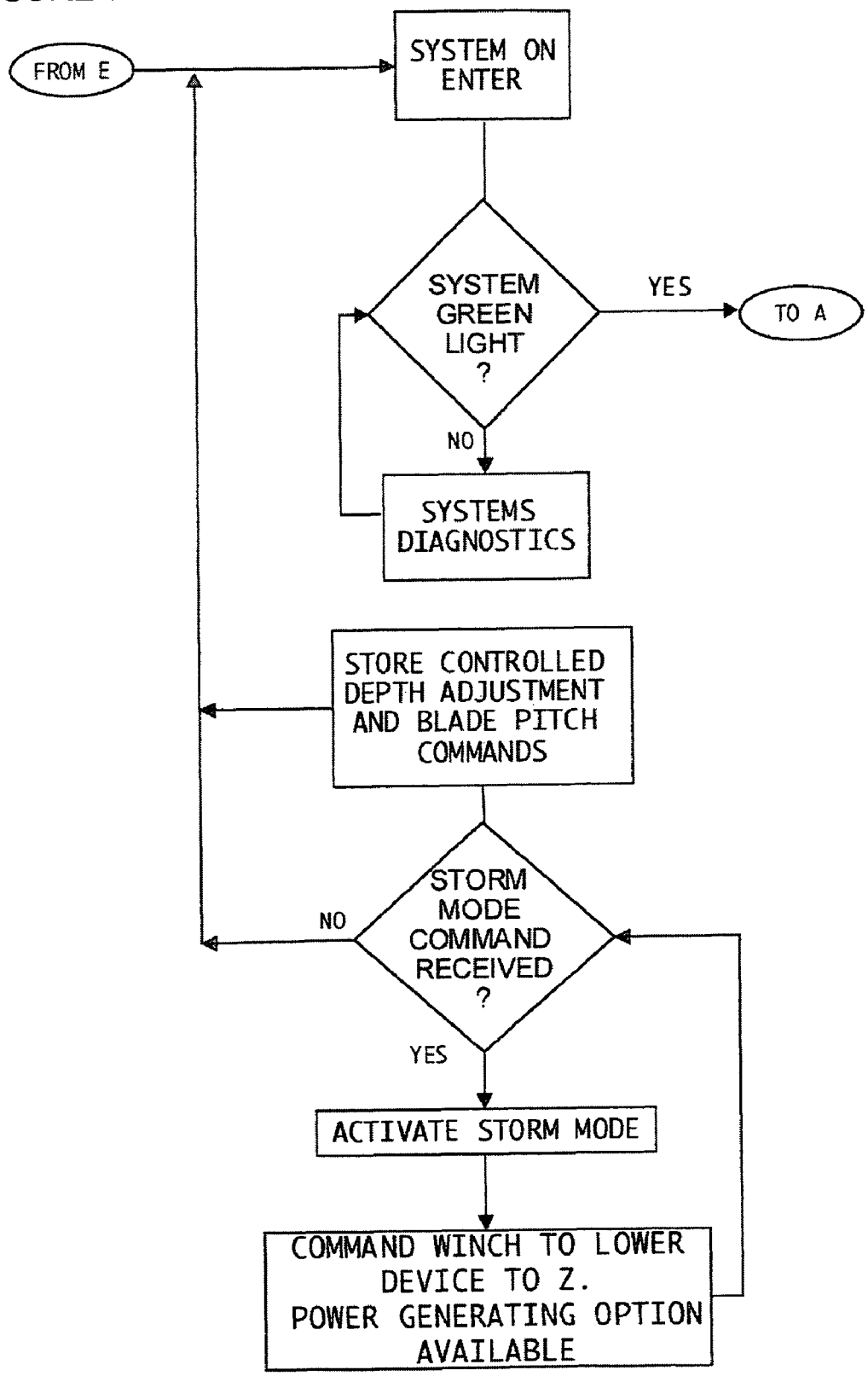
Figure 10:
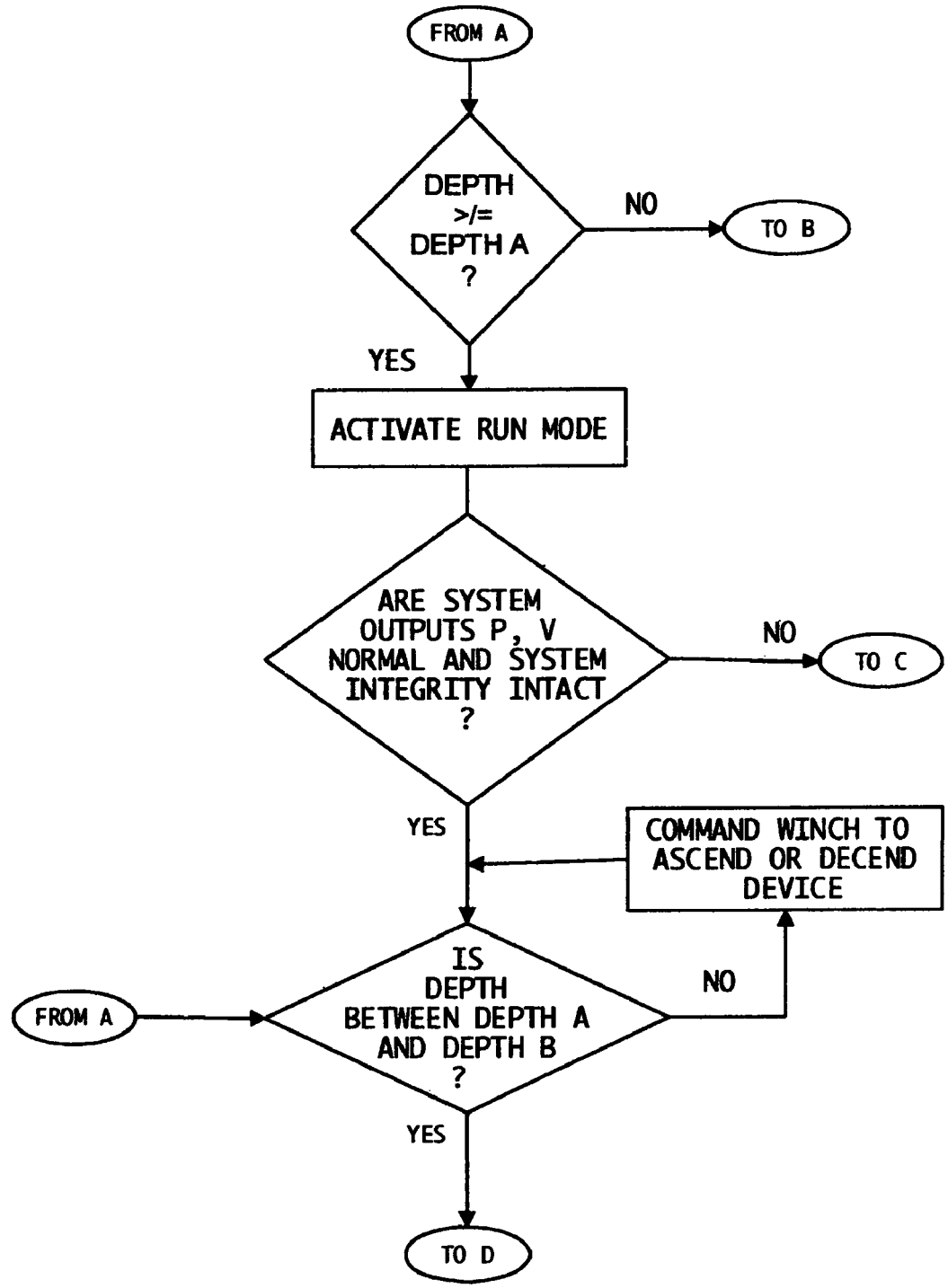
Figure 11:
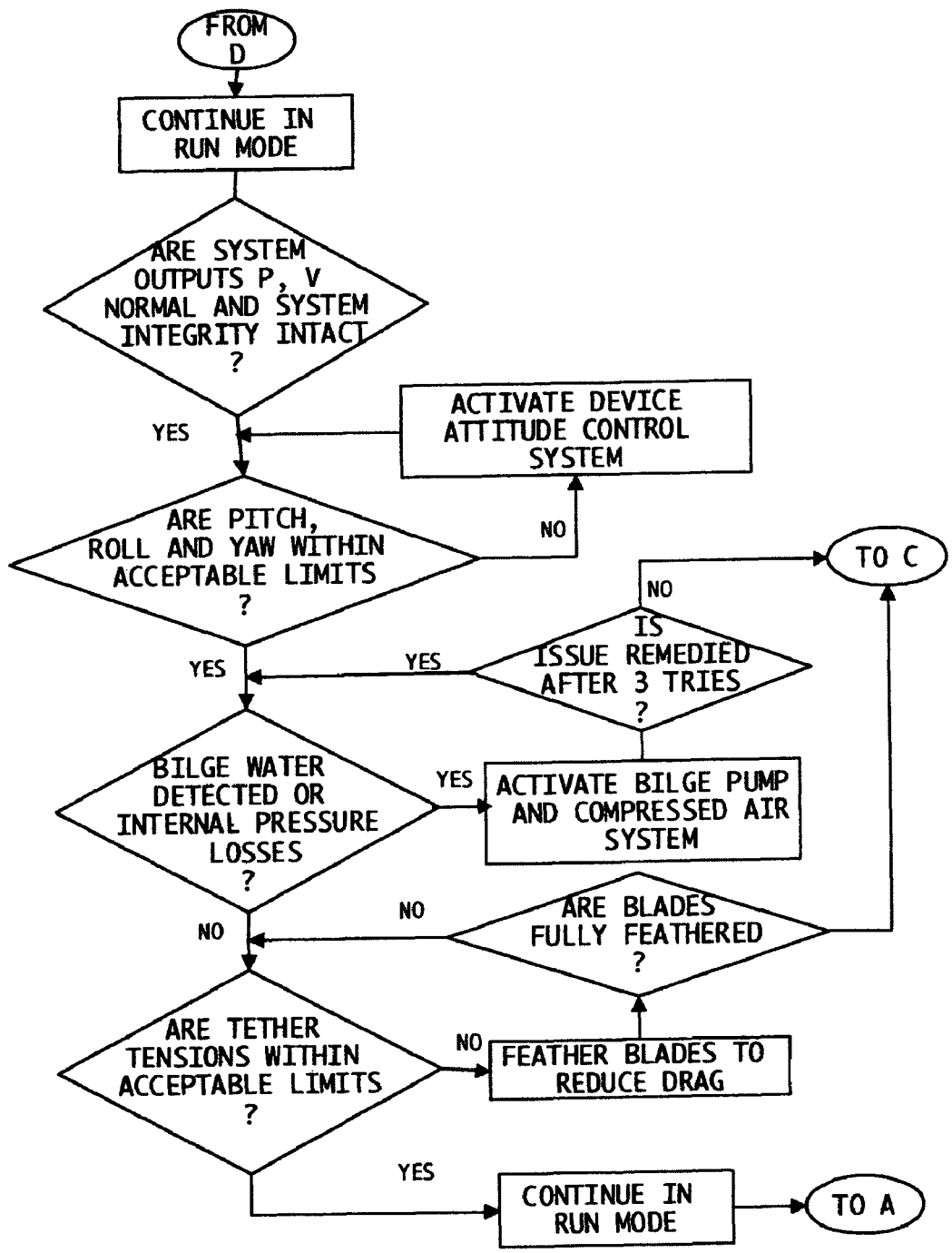
Figure 12:
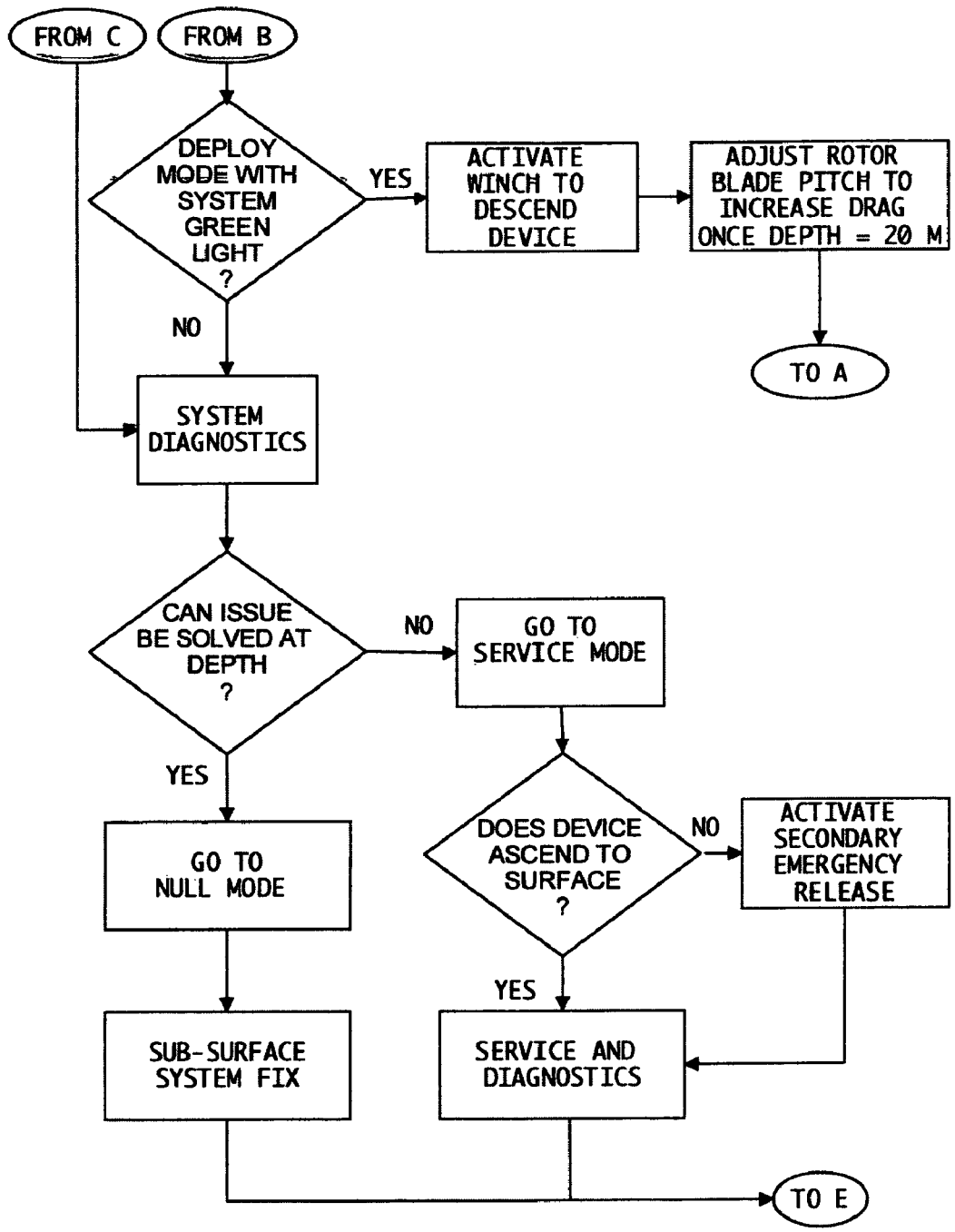
Figure 13:
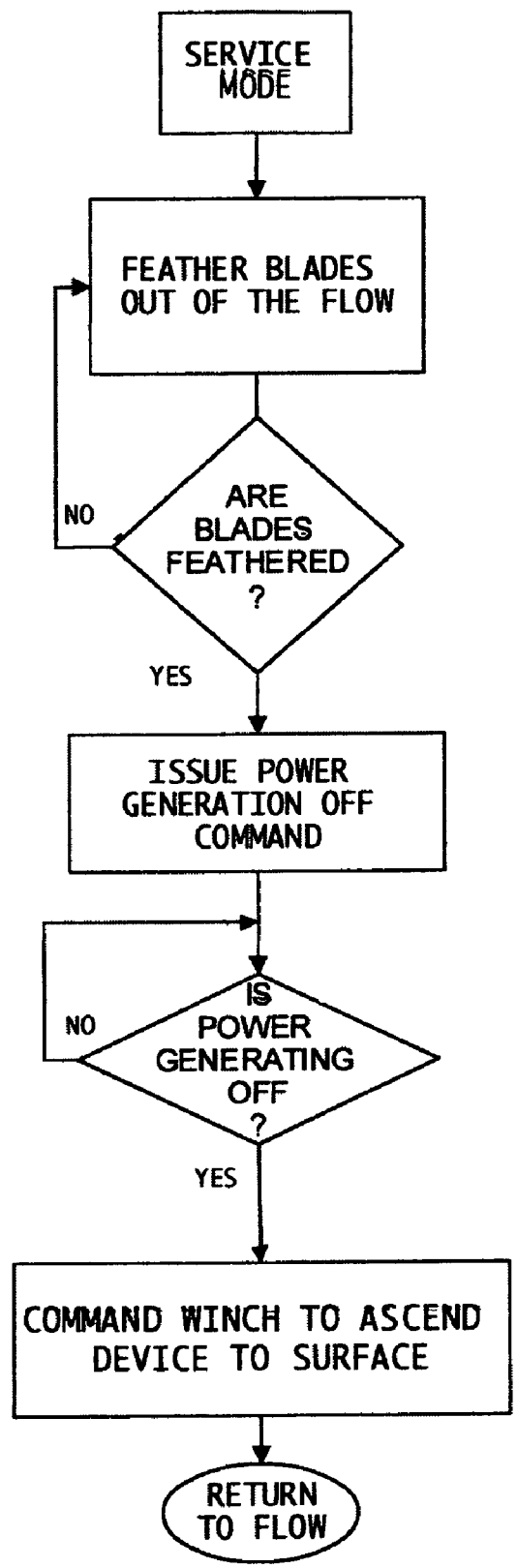
Figure 14:
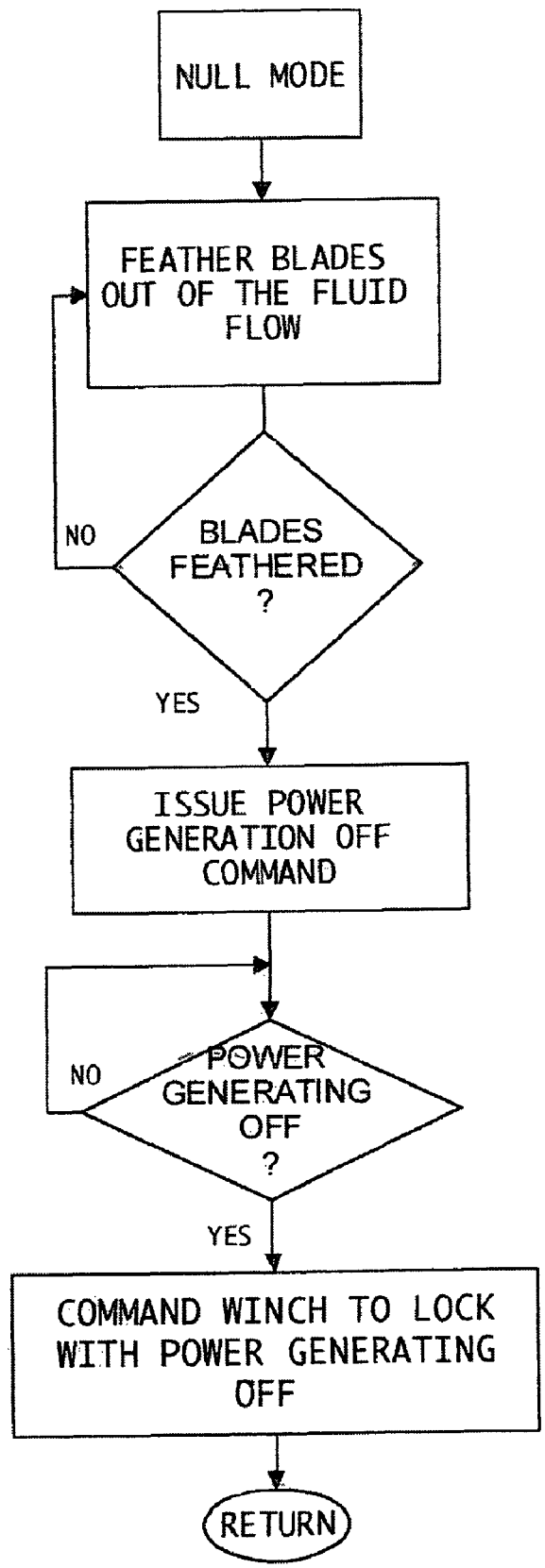

The block diagram of FIG. 8, along with the flow diagrams of FIGS. 9-15, shows a control system and software for controlling operation of the embodiment shown in FIG. 1, i.e. an embodiment with a hydrofoil (and therefore lift forces if the current is not zero).

The vertical lift, buoyancy, gravity, and drag forces balance at a given flow velocity, and resultant tether tensions are apparent. These tether tensions change with changes in current velocities, changes in lift surfaces (fouling), and changes in rotor blade pitch. The device position is controlled between a maximum depth and a minimum depth in a water current flowing in a known direction and current velocity. The maximum and minimum depths for operation and maximum operational velocity of an underwater power-generating device are programmed into a control processor, which is part of the control system (300), from a command control center. The command control center may be an on-shore command center, a satellite or other remote source of commands. For example, the device may be programmed with 30 meters as the selected minimum depth, 75 meters as the selected maximum depth, and 2.00 meters per second as the selected maximum velocity.

Sensors are input to the control system as shown in FIG. 8. They are pitch and roll, yaw, depth, control tether cable tension, rotor blade pitch, nacelle bilge water, vibration detection on the transmission, generator and shaft bearings, grid status, hydraulic pressure, compressed air, temperature of nacelle, coolant temperature, transmission temperature generator temperature, shore control commands, and local control commands. These sensors provide information to the control system and identify conditions requiring depth adjustments, submergence or shutdown. Shutdown conditions include (1) grid loss (2) excessive vibration from tether failure, a failed gear box, a failed generator, a cracked rotor blade, wave and turbulence effects, etc. (3) excessive temperature in the generator, gear box, nacelle air, etc. (4) excessive pitch (5) excessive yaw and (6) excessive roll.

The control system is coupled, via the rotor blade pitch actuator to the rotor blades. The control system can alter the pitch of the rotor blades to change the drag exerted by the water current on the rotors.

The controls initiate adjustment of the variable pitch of the rotor blades. The controls initiate adjustment of tension on the control tethers through use of the winching system shown in FIG. 7. The control system maintains the underwater power-generating power device at a desired operating depth, located between the selected maximum and minimum depths. The control system may be a microprocessor that is programmed to perform the functions described.

Method of Operation

FIGS. 9-14 are flow diagrams of control software for the device of FIG. 1. In operation, the control system is first set with an upper limit and a lower limit for the depth at which the system may operate. The underwater power-generating device is then lowered to the selected target depth and the winch controls activated to lock the underwater power-generating device in the existing current flow velocity.

The centerline depth of operation in an ocean current may be 50 meters below the surface of the water. The objective is to maintain the underwater power-generating device at a desired operating depth between a selected maximum depth and a selected minimum depth for normal operations. Generally, electrical power generation is maximized up to the peak operating efficiency of the generator, consistent with the water current speed for which the rotors are designed.

The control system is programmed to control the device in response to several situations. The controls are simplified to varying the pitch of the rotor blades by means of the rotor blade pitch actuator, and to varying the line length of the variable length tether. The variable length tether is taken in or let out by the winch controls, which are a depth adjusting system. A device attitude control system is employed, which controls the power between the two nacelles to control the attitude (yaw, pitch and roll) of the device.

Systems outputs P, V normal and system integrity intact means are Power (P) and Voltage (V) within production limits. Systems integrity intact is defined as temperatures, vibration, grid connection/status and more operating within specified limits.

The device is descended to the depth at the centerline, which needs to be at least 20 m before the blades are loaded, so that the entire blade radius of 20 m is submerged. The "depth" is referenced from the centerline of the hub/rotor diameter.

The service mode sub-program flow diagram commands the winch to cause the device to ascend to the surface. Upon sub-program completion, the flow returns to the main flow diagram and flow continues with "Does device ascend to the surface". If so, the service and diagnostics are performed at the surface of the water. If not, the "Activate secondary emergency release" logic is entered.

The invention claimed is:
1. An underwater power-generating device comprising:
a pair of electric generators each of which includes a turbine with a rotor and is housed in a fluid-tight nacelle, wherein the fluid-tight nacelles are connected together by a hydrofoil and provide buoyancy;
wherein each of the fluid-tight nacelles is connected by a pair of device tethers to a buoyancy providing strut being moveable to control depth of the device;

wherein a pair of control tethers is connected to the buoyancy providing strut and joins into a left side tether, a pair of control tethers is connected to the buoyancy providing strut and joins into a right side tether, and a pair of control tethers is connected to the buoyancy providing strut and joins into a main tether;

wherein the main tether, the left side tether and the right side tether anchor said buoyancy providing strut, at least one of said tethers being a variable length tether; and wherein a length control is connected to said variable length tether.

2. The underwater power-generating device according to claim 1, wherein said length control is provided by at least one winch for controlling tension on one or more tethers.

3. The underwater power-generating device according to claim 2, wherein the length control is arranged in the strut.

4. The underwater power-generating device according to claim 3, wherein the buoyancy providing strut is provided with a hollow tank or foam filled portion to provide buoyancy.

5. The underwater power-generating device according to claim 4, wherein each of the nacelles is provided with hollow or foam filled tanks to provide buoyancy.

6. The underwater power-generating device according to claim 1, wherein the length control is arranged in the strut.

7. The underwater power-generating device according to claim 1, wherein the buoyancy providing strut is provided with a hollow tank or foam filled portion to provide buoyancy.

8. The underwater power-generating device according to claim 2, wherein the buoyancy providing strut is provided with a hollow tank or foam filled portion to provide buoyancy.

9. The underwater power-generating device according to claim 1, wherein each of the nacelles is provided with hollow or foam filled tanks to provide buoyancy.

10. The underwater power-generating device according to claim 6, wherein each of the nacelles is provided with hollow or foam filled tanks to provide buoyancy.

11. The underwater power-generating device according to claim 7, wherein each of the nacelles is provided with hollow or foam filled tanks to provide buoyancy.

12. The underwater power-generating device according to claim 2, wherein each of the nacelles is provided with hollow or foam filled tanks to provide buoyancy.

13. The underwater power-generating device according to claim 3, wherein each of the nacelles is provided with hollow or foam filled tanks to provide buoyancy.

14. The underwater power-generating device according to claim 6, wherein the buoyancy providing strut is provided with a hollow tank or foam filled portion to provide buoyancy.

15. The underwater power-generating device according to claim 14, wherein each of the nacelles is provided with hollow or foam filled tanks to provide buoyancy.

* * * * *